(No Model.)

H. GREENFIELD.
TWO WHEELED VEHICLE.

No. 293,572. Patented Feb. 12, 1884.

Attest
F. J. Campbell
Chas. F. Herr

Inventor:
Harry Greenfield,
by Drake & Co. Att'ys.

UNITED STATES PATENT OFFICE.

HARRY GREENFIELD, OF HARRISON, NEW JERSEY, ASSIGNOR TO HINCKS & JOHNSON, OF BRIDGEPORT, CONNECTICUT.

TWO-WHEELED VEHICLE.

SPECIFICATION forming part of Letters Patent No. 293,572, dated February 12, 1884.

Application filed October 23, 1883. (No model.)

*To all whom it may concern:*

Be it known that I, HARRY GREENFIELD, a citizen of the United States, residing at Harrison, in the county of Hudson and State of New Jersey, have invented certain new and useful Improvements in Two-Wheel Vehicles or Cabs; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to improvements in two-wheel vehicles or cabs, especially those known as "Hansom" cabs, in which the driver's seat is placed above the occupant's seat, and is intended to simplify and cheapen the construction of said vehicles, and also to secure other advantages, which will be described hereinafter.

The invention consists in the construction and arrangement of the various parts, as will be set forth and claimed.

Figure 1:
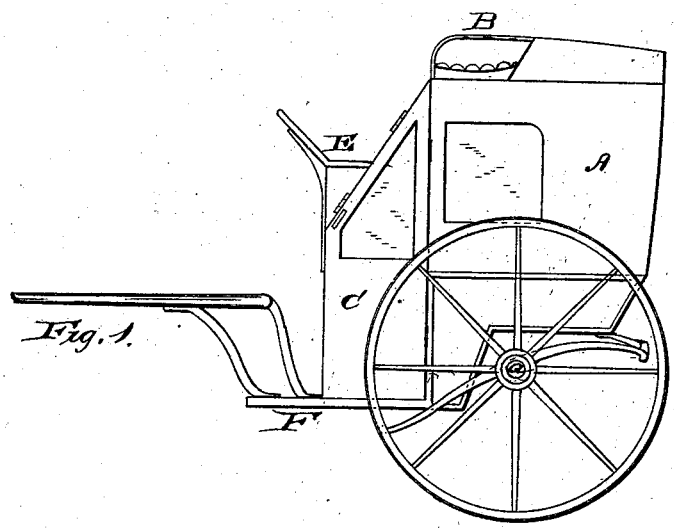
Figure 2:
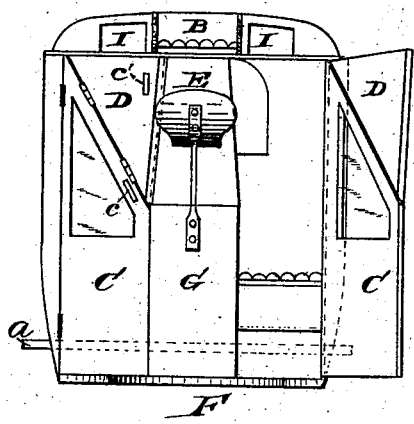
Figure 3:
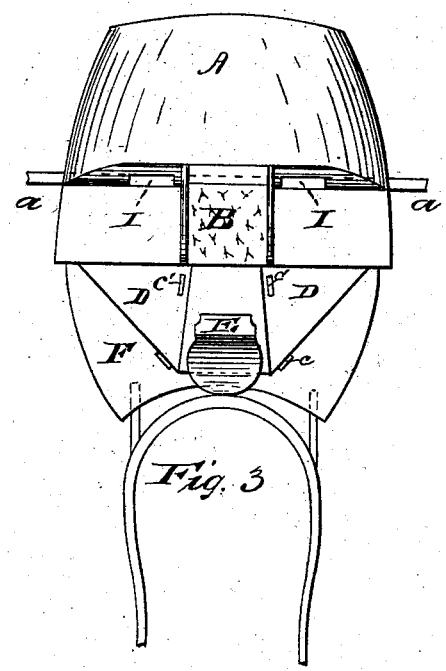

In the drawings, Figure 1 is a side elevation of a vehicle illustrating my improvements. Fig. 2 is a front elevation of the same with the wheels and shaft removed, and Fig. 3 is a plan view.

Similar letters of reference indicate like parts in the several figures.

In carrying out my invention, I construct the back portion of the body similar to vehicles already in use.

In the drawings, A is said back portion; B, the driver's seat, placed immediately over the axle $a$, being a part of the body. C are the doors of the cab, placed in the front thereof, and preferably at an angle, as shown in the figures, more especially in Fig. 3. D are supplemental doors hinged to the doors C at the top, adapted to cover the triangular openings not closed by said doors, both of said doors being provided with suitable handles, $c$ $c'$. E is the foot-board. F is the bottom board of the cab, extending forward a suitable distance. G is a permanent upright, inclined at the top, to which is secured the foot-board E. I are openings, through which the person within can communicate with the driver. Any suitable device may be used to keep the doors open when desirable.

Heretofore whenever the driver's seat has been elevated above the occupant, it has been placed either forward of the axle, and so bringing the weight of the driver when in the seat upon the horse, or else at the rear, thereby bringing the weight of the driver back of the axle, and tending to tilt the body of the vehicle backward and raising the shafts, to the great discomfort of the horse and inconvenience of the occupant. By my improved arrangement of the driver's seat the driver is located immediately over the axle, thereby balancing the parts and relieving the horse of the upward strain of the shafts and also of the weight of the driver. It will be further observed by reference to the drawings that the seat of the occupant is also located over but extends farther back of the axle than does the driver's seat, and the driver, by moving forward or backward on his seat, can regulate the direction of his weight, thereby still further balancing the weight on the axle and relieving the horse entirely of any strain, the advantage of which will be readily seen. Another advantage gained by my construction is that, being a closed cab, it is perfectly water-tight, and the cab may be thoroughly ventilated by opening the doors in front, the air circulating through. Moreover, by relieving the parts of the strain caused by placing the driver's seat at the rear and making said seat a part of the body, they can be made much lighter, and consequently cheaper. The driver can also better control the horse and avoid accidents, his view not being obstructed by the cab itself and by packages that may be placed on the top, as is the case in the Hansom cabs.

Having thus described my invention, what I claim is—

A two-wheel vehicle having the driver's seat placed above the occupant's seat and over or forward of the axle, and provided on the front side with doors C and supplemental doors D, all substantially as herein set forth.

In testimony that I claim the foregoing I have hereunto set my hand this 15th day of October, 1883.

HARRY GREENFIELD.

Witnesses:
OLIVER DRAKE,
WM. WEIDNER.